(12) United States Patent
Rosén et al.

(10) Patent No.: US 12,281,802 B2
(45) Date of Patent: Apr. 22, 2025

(54) METHOD AND CONTROL UNIT FOR CONTROLLING A CONTROL VALVE CONTROLLING A FLOW OF HEAT TRANSFER FLUID INTO A THERMAL ENERGY EXTRACTION UNIT

(71) Applicant: E.ON SVERIGE AB, Malmo (SE)

(72) Inventors: Per Rosén, Lund (SE); Jacob Skogström, Lomma (SE); Fredrik Rosenqvist, Helsingborg (SE); Bengt Lindoff, Bjarred (SE); Helen Carlstrom, Bjarred (SE)

(73) Assignee: E.ON SVERIGE AB, Malmo (SE)

( * ) Notice: Subject to any disclaimer, the term of this patent is extended or adjusted under 35 U.S.C. 154(b) by 424 days.

(21) Appl. No.: 17/755,743

(22) PCT Filed: Oct. 27, 2020

(86) PCT No.: PCT/EP2020/080188
§ 371 (c)(1),
(2) Date: May 6, 2022

(87) PCT Pub. No.: WO2021/089370
PCT Pub. Date: May 14, 2021

(65) Prior Publication Data
US 2022/0381449 A1    Dec. 1, 2022

(30) Foreign Application Priority Data
Nov. 7, 2019  (EP) ..................................... 19207690

(51) Int. Cl.
*F24D 10/00*        (2022.01)
(52) U.S. Cl.
CPC .................................. *F24D 10/003* (2013.01)

(58) Field of Classification Search
CPC ....... F24D 10/003; F24D 10/00; Y02B 30/17; Y02E 20/14
See application file for complete search history.

(56) References Cited

U.S. PATENT DOCUMENTS

| | | | |
|---|---|---|---|
| 7,069,976 B2 * | 7/2006 | Lindgren | ............ F24D 19/1051 236/78 D |
| 2016/0010015 A1 * | 1/2016 | Van Thorre | ............... C10L 5/14 44/589 |
| 2018/0347868 A1 | 12/2018 | Okano et al. | |

FOREIGN PATENT DOCUMENTS

| | | |
|---|---|---|
| AU | 2016/348507 A1 | 5/2018 |
| CN | 102401450 A | 4/2012 |

(Continued)

OTHER PUBLICATIONS

International Search Report and Written Opinion of PCT/EP2020/080188, dated Nov. 19, 2020 in 9 pages.

*Primary Examiner* — Patrick C Williams
(74) *Attorney, Agent, or Firm* — Knobbe, Martens, Olson & Bear, LLP

(57) ABSTRACT

Disclosed is a method for controlling a control valve (110), wherein the control valve (110) is configured to control a flow of heat transfer fluid to a thermal energy extraction unit (108). The method comprising: reviewing (S402) a demand signal for the control valve (110); checking (S404) if the demand signal is indicative of setting the control valve (110) in a hysteresis interval for the control valve (110); and upon the demand signal is indicative of setting the control valve (110) in the hysteresis interval, alternatingly (S406) setting the control valve (110) in an open state above the hysteresis interval and setting the control valve (110) in a closed state.

14 Claims, 4 Drawing Sheets

(56) References Cited

FOREIGN PATENT DOCUMENTS

| | | |
|---|---|---|
| CN | 102536967 A | 7/2012 |
| CN | 103487172 A | 1/2014 |
| CN | 104373995 A | 2/2015 |
| CN | 107543290 A | 1/2018 |
| CN | 108548352 A | 9/2018 |
| CN | 108603667 A | 9/2018 |
| CN | 109059369 A | 12/2018 |
| CN | 109073241 A | 12/2018 |
| CN | 109931677 A | 6/2019 |
| EP | 3425474 A1 | 1/2019 |
| EP | 3483690 | 5/2019 |
| JP | H10-246518 A | 9/1998 |
| WO | WO 96/23178 A1 | 8/1996 |
| WO | WO 02/090832 | 11/2002 |
| WO | WO 2017/076866 | 5/2017 |

* cited by examiner

METHOD AND CONTROL UNIT FOR CONTROLLING A CONTROL VALVE CONTROLLING A FLOW OF HEAT TRANSFER FLUID INTO A THERMAL ENERGY EXTRACTION UNIT

FIELD OF THE INVENTION

The invention generally relates to controlling a control unit configured to controlling a flow of heat transfer fluid into a thermal energy extraction unit.

BACKGROUND OF THE INVENTION

Today, it is common practice in many parts of the world to provide heating and hot water, or cooling and cold water, for houses and buildings via a district heating or cooling system. The district heating or cooling system comprises control valves arranged to control the flow of heat transfer fluid within the system. Each control valve has a flow interval indicating how small and large the flow controlled through the control valve can be. Upon the flow is smaller than a lower flow limit of the flow interval, the control valve is set in a hysteresis interval. When the control valve is set in the hysteresis interval, it lacks controllability which will lead to bad comfort, noise, and wear problems within the system. This usually occurs for control valves arranged within houses and buildings during low load situations, wherein the flow of the heat transfer fluid in the system is lower than normal. A low load situation is common during summertime for district heating system and during wintertime for district cooling system.

SUMMARY OF THE INVENTION

It is an object of the present invention to solve at least some of the problems mentioned above.

According to a first aspect, a method for controlling a control valve, wherein the control valve is configured to control a flow of heat transfer fluid to a thermal energy extraction unit is provided. The method comprising:
  reviewing a demand signal for the control valve;
  checking if the demand signal for the control valve is indicative of setting the control valve in a hysteresis interval for the control valve; and
  upon the demand signal is indicative of setting the control valve in the hysteresis interval, alternatingly setting the control valve in an open state above the hysteresis interval or setting the control valve in a closed state.

By the present method, the control valve is not allowed to be set in the hysteresis interval. Instead, the control valve is either set above the hysteresis interval or in its closed position. Since the control valve is not allowed to be set in the hysteresis interval, the control valve may all the time have control capacity in order to regulate a flow passage of the control valve. Further, problems with bad comfort, noise and wear may be avoided. This since the control valve is not allowed to be set within the hysteresis interval thereof. By alternatingly setting the control valve above the hysteresis interval or closing the control valve, the integral flow through the control valve over time may be set to be the same or substantially the same as the flow intended by the demand signal for the control valve. The method may further be implemented in existing control functionality without any hardware modifications. The demand signal is a signal indicative of a desired flow rate through the control valve. The demand signal corresponds to a degree of opening for the control valve.

The step of alternatingly setting the control valve in an open state above the hysteresis interval or setting the control valve in the closed state may be performed by alternatingly setting the control valve in an open state above the hysteresis interval until a first predetermined criterion is fulfilled and setting the control valve in the closed state until a second predetermined criterion is fulfilled.

The first predetermined criterion may be a first predetermined time period. The second predetermined criterion may be a second predetermined time period. The first and second predetermined time period may be in the order of minutes to hours.

The first predetermined criterion may be a first temperature in a local thermal energy circuit configured to extract thermal energy from the thermal energy extraction unit. The first temperature may be a temperature reading of a temperature of heat transfer fluid flowing in the local thermal energy circuit. The heat transfer fluid whose temperature is read may either flow into or out from the thermal energy extraction unit. The second predetermined criterion may be a second temperature in the local thermal energy circuit configured to extract thermal energy from the thermal energy extraction unit. The second temperature may be a temperature reading of a temperature of heat transfer fluid flowing in the local thermal energy circuit. The heat transfer fluid whose temperature is read may either flow into or out from the thermal energy extraction unit.

The step of checking if the demand signal is indicative of setting the control valve in the hysteresis interval for the control valve may further comprise checking in a look-up table if the demand signal pertains to if the control valve is set in the hysteresis interval or not upon controlling the control valve using the demand signal.

The step of checking if the demand signal is indicative of setting the control valve in the hysteresis interval for the control valve may further comprise:
  translating the demand signal to a degree of opening for the control valve; and
  checking in the look-up table if the degree of opening is within the hysteresis interval for the control valve.

The demand signal for the control valve may be received from a local thermal energy circuit configured to extract heat or cold from the thermal energy extraction unit.

According to a second aspect, a control unit is provided. The control unit is configured to control a control valve. The control valve may be configured to control a flow of heat transfer fluid into a thermal energy extraction unit. The control unit comprises a communication module and a control circuit. The communication module is configured to receive a demand signal indicative of setting the control valve in a specific degree of opening. The demand signal may be communicated from a local thermal energy circuit. The control circuit is configured to execute a checking function and a generating function. The checking function is configured to check if the demand signal, received by the communication module, is indicative of setting the control valve in a hysteresis interval for the control valve. The generating function is configured to, upon the received demand signal is indicative of setting the control valve in the hysteresis interval for the control valve, generate a first and a second control signal for alternatingly setting the control valve in an open state above the hysteresis interval or setting the control valve in a closed state, respectively. The communication module is further configured to send the first and second control signals to the control valve. The first and second control signals may be temporally distinct from each other. Hence, the first control signal is configured to control the control valve to be set in an open state above the hysteresis interval and the second control signal is configured to set the control valve in a closed state.

The first control signal may be configured to set the control valve in an open state above the hysteresis interval until a first predetermined criterion is fulfilled. The second control signal may be configured to set the control valve in the closed state until a second predetermined criterion is fulfilled.

The first predetermined criterion may be a first predetermined time period. The second predetermined criterion may be a second predetermined time period. The control unit may further comprise a clock configured to determine the first predetermined time period and the second predetermined time period. The generating function is further configured to generate the second control signal upon the first predetermined time period is fulfilled and to generate the first control signal upon the second predetermined time period is fulfilled.

The first predetermined criterion may be a first predetermined temperature. The second predetermined criterion may be a second predetermined temperature. The first predetermined temperature may be higher than a flow line temperature. The second predetermined temperature may be lower than the flow line temperature. The flow line temperature may be the temperature of the heat transfer fluid which the control valve is arranged to control. The communication module may further be configured to receive a temperature signal indicative of a temperature of the heat transfer fluid in the local thermal energy circuit configured to extract thermal energy from the thermal energy extraction unit. The generating function may further be configured to generate the second control signal upon the temperature signal is above the first temperature and to generate the first control signal upon the temperature signal is below the second temperature.

The control unit may further comprise a look-up table. The look-up table may comprise information pertaining to if a specific demand signal is indicative of if the control valve is to be set in the hysteresis interval for the control valve or not, wherein the checking function is configured to check if the demand signal is indicative of setting the control valve in the hysteresis interval for the control valve by accessing the look-up table.

The checking function may further be configured to translate the received demand signal to a degree of opening for the control valve; and check in the look-up table if the degree of opening is within the hysteresis interval for the control valve.

The above mentioned features of the first aspect, when applicable, apply to this second aspect as well. In order to avoid undue repetition, reference is made to the above.

According to a third aspect, a thermal energy system is provided. The thermal energy system comprising:
 a thermal energy extraction unit connectable to a district grid;
 a local thermal energy circuit connected to the thermal energy extraction unit for receiving heat or cold from the same;
 a control valve configured to control a flow of heat transfer fluid from a first conduit of the district grid, via the thermal energy extraction unit, to a second conduit of the district grid; and
 a control unit according to the second aspect.

The above mentioned features of the first and second aspect, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claims, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments are the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
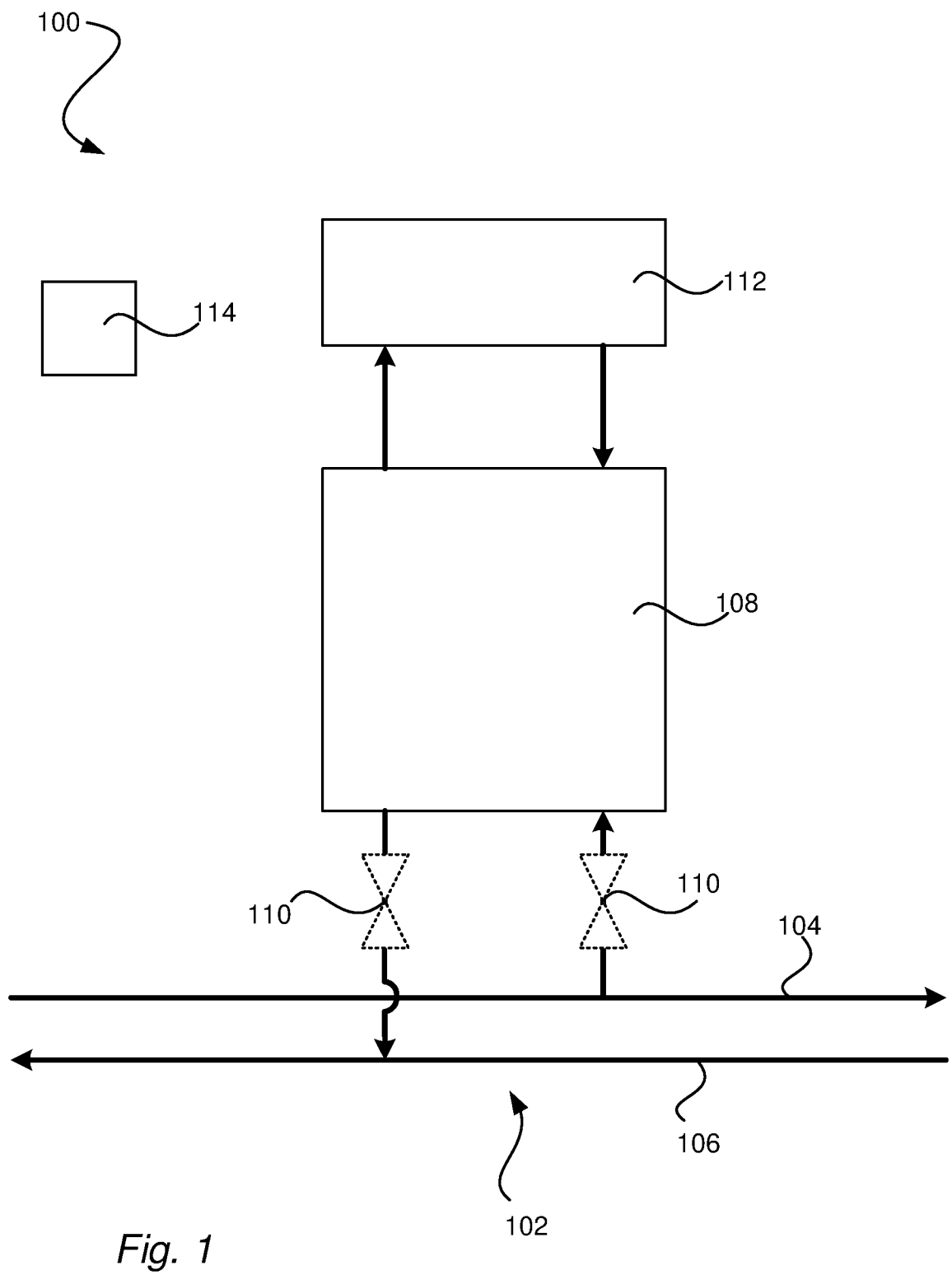
FIG. 1 is a schematic diagram of a thermal energy system.

In connection with FIG. 1 a thermal energy system 100 will be discussed. The thermal energy system 100 may be any system suitable for distributing thermal energy. Thus, the thermal energy system may be configured to provide heating and hot water, or cooling and cold water, for houses and buildings via a district grid 102. The district grid 102 may be referred to as a primary side of the thermal energy system 100. As non-limiting examples, the district grid 102 may be a district heating system or a district cooling system known in the art. The thermal energy system 100 comprises a thermal energy extraction unit 108. As non-limiting examples, the thermal energy extraction unit 108 may be a district heating or a district cooling heat exchanger. As yet non-limiting examples, the thermal energy extraction unit 108 may be a district cooling heat pump or a district heating heat pump. The thermal energy extraction unit 108 is connected to the district grid 102.

The district grid 102 comprises two conduits, a first conduit 104 and a second conduit 106. The first conduit 104 may be a feed conduit of the district grid 102. The second conduit 106 may be a return conduit of the district grid 102. The first conduit 104 is configured to transport a heat transfer fluid to the thermal energy extraction unit 108. The second conduit 106 is configured to transport the heat transfer fluid from the thermal energy extraction unit 108. The heat transfer fluid transported by the second conduit 106 may be transported to a production plant configured to heat or cool incoming heat transfer fluid and supply it to the first conduit 104.

The heat transfer fluid may be any fluid suitable for heating or cooling, respectively, such as water. However, according to another example, other heat transfer fluids may be used. Some non-limiting examples are ammonia, oils, alcohols, and anti-freezing fluids such as glycol. The heat transfer liquid may also comprise a mixture of two or more of the heat transfer fluids mentioned above.

As an alternative of being the district heating or district cooling system, the district grid 102 may be a combined district heating and cooling system as previously disclosed in, e.g., WO 2017/076868 filed by E.ON Sverige AB. In such as case, the two conduits 104, 106 are not to be seen as the feed and return conduits but instead to be seen as a hot conduit and a cold conduit, wherein the hot conduit is configured to hold thermal fluid being warmer than the thermal fluid in the cold conduit.

The thermal energy extraction unit 108 is configured to extract heat and/or cold from the district grid 102 it is connected to. A control valve 110 is configured to control the flow of the heat transfer fluid flowing through the thermal energy extraction unit 108. Hence, the control valve 110 may be configured to control a flow of heat transfer fluid from the first conduit 104 via the thermal energy extraction unit 108 and back into the second conduit 106. Alternatively, the control valve 110 may be configured to control a flow of heat transfer fluid from the second conduit 106 via the thermal energy extraction unit 108 and back into the first conduit 104. The control valve is controlled by a control unit 114. By controlling the control valve 110 the extraction of heat and/or cold made by the thermal energy extraction unit 108 may be regulated. Extraction of heat and/or cold may in the context of the preset application also be described as extraction of thermal energy. The control unit 114 will be discussed in more detail in connection to FIG. 2.

The control valve 110 may be arranged at an inlet of the thermal energy extraction unit 108. Alternatively, or in combination, the control valve 110 may be arranged at an outlet of the thermal energy extraction unit 108. This is illustrated in FIG. 1 as the control valve 110 is illustrated with dotted lines.

The thermal energy extraction unit 108 is further configured to distribute the extracted thermal energy to the house or building it is arranged in. This is made through a local thermal energy circuit 112. The local thermal energy circuit 112 may be referred to as a secondary side of the thermal energy system 100. As non-limiting examples, the local thermal energy circuit 112 may be a comfort heating or a comfort cooling circuit, a circuit for tap water, a central heating circuit, or any other circuit configured to provide cold or heat to the building. Hence, the thermal energy extraction unit 108 is connected to the local thermal energy circuit 112. The thermal energy extraction unit 108 is fluidly separating the local thermal energy circuit 112 and the district grid 102. Hence, heat transfer fluid of the district grid 102 is separated from heat transfer fluid of the local thermal energy circuit 112. The thermal energy extraction unit 108 is configured to distribute heat or cold extracted from heat transfer fluid of the district grid 102 into heat transfer fluid of the local thermal energy circuit 112. The local thermal energy circuit 112 may comprise a temperature sensor configured to determine a temperature of the heat transfer fluid therein. A temperature sensor may be arranged at the outlet from the thermal energy extraction unit 108. Alternatively, or in combination, a temperature sensor may be arranged at the inlet from the thermal energy extraction unit 108.

Further, a pressure sensor configured to determine the differential pressure over the control valve 110 may be present. The differential pressure is the difference between the downstream pressure and the upstream pressure over the control valve 110.

Moreover, the local thermal energy circuit 112 may comprise a thermal energy demand sensor. The thermal energy demand sensor is configured to determine a demand for thermal energy (heat or cold) to be delivered by the local thermal energy circuit 112. The thermal energy demand sensor may further be configured to transmit the determined demand as a demand signal to the control unit 114. As a non-limiting example, upon the local thermal energy circuit 112 is not depending on outdoor conditions, the demand may be based on the determined temperature and the determined differential pressure. According to another example, wherein the local thermal energy circuit 112 is the comfort heating circuit, the demand may be based on information from an outdoor temperature sensor. The information may be translated to the demand to be delivered by the comfort heating circuit. According to yet another example, wherein the local thermal energy circuit 112 is the comfort cooling circuit, the demand may be based on information from indoor temperature sensors positioned in the building. The information may be translated to the demand to be delivered by the comfort cooling circuit. This approach may be used for comfort heating circuits as well.

The flow of heat transfer fluid flowing through the control valve 110 is controlled by changing a size of a flow passage of the control valve 110 and by changing the differential pressure over the control valve 110. The size of the flow passage will henceforth be referred to as a "degree of opening". The degree of opening for the control valve 110 may be between 0-100% degree of opening. Upon the degree of opening for the control valve 110 is 0%, the control valve 110 is closed. Upon the degree of opening for the control valve 110 is 100%, the control valve 110 is fully opened. The control valve 110 may be configured to vary the degree of opening of the control valve 110 based on a control signal. The control signal will be discussed in more detail in connection to FIGS. 2 and 3. The degree of opening and the differential pressure over the control valve 110, determined by the pressure sensor, may determine the flow flowing through the control valve 110. Thus, same degree of opening may not contribute to the same flow through the control valve 110 if the differential pressure over the control valve is not the same. By way of example, at high differential pressures, more fluid is flowing through the control valve 110 than at low differential pressures, even if it is the same control valve 110 having the same degree of opening. Hence, a certain degree of opening and a certain differential pressure will give a certain flow through the control valve 110. Further, the flow through the control valve 110 may also depend on the temperature of the heat transfer fluid. The temperature of the heat transfer fluid may vary depending on season of the year but also the location of the building wherein the local thermal energy circuit 112 and the control valve 110 is located. Thus, the local thermal energy circuits 112 arranged close to the production plant of the district grid 102 may be exposed to a higher differential pressure than the local thermal energy circuit 112 arranged further away from the production plant. By controlling the degree of opening, based on the differential pressure over the control valve 110 and the flow through the control valve 110, the temperature of the extracted thermal energy may be controlled.

The control valve 110 may have a maximum controllable degree of opening, a limitation for how large a controllable flow through the control valve 110 can be, but also a minimum controllable degree of opening, a limitation for how small a controllable flow through the control valve 110 can be. The control valve 110 may also have a hysteresis interval. The hysteresis interval ranges from a closed position of the control valve 110 to the minimum controllable degree of opening for the control valve 110. For example, the hysteresis interval may range from 0-10% of the degree of opening. Thus, the minimum degree of opening may then be 10% of the degree of opening. The hysteresis interval linked to the degree of opening for the control valve 110 may vary depending on the differential pressure over the control valve 110. A relatively high differential pressure may lead to that a relatively larger part of the degree of opening interval is within the hysteresis interval. Each control valve 110 may have different maximum and minimum degree of opening and therefore, also different hysteresis intervals. Upon the control valve 110 is set above the hysteresis interval, between the minimum and maximum controllable degree of opening, the control valve 110 has a capability to control the flow through the control valve 110 by controlling the degree of opening. Further, upon the control valve 110 is set in the hysteresis interval, below the minimum controllable degree of opening, the control valve 110 lacks the control capability. Hence, by trying to set a certain degree of opening in within the hysteresis interval you will not know the flow through the control valve 110.

According to one example, the hysteresis interval for the control valve 110 may be determined by the producer of the control valve 110. According to another example, where the hysteresis interval is unknown, the hysteresis interval for the control valve 110 may be determined during a calibration of the control valve 110. The calibration may be made by measuring the differential pressure over the control valve 110 as a function of the control signal. Upon the differential pressure may be fully controlled by changing the control signal, the control valve 110 is outside the hysteresis interval and vice versa. According to yet another example, the hysteresis interval for the control valve 110 may be determined during a second calibration of the control valve 110. The second calibration may be made by controlling different demand signals to the control valve 110. In this example, the demand signal may be based on flow signals from a flow sensor, wherein the flow sensor may be arranged in the local thermal energy circuit 112. By controlling different demand signals, a linear relation between the demand and the flow may occur at some point. Upon that may be the case, the hysteresis interval may be found. This approach may be used for linear control valves.

Data pertaining to the hysteresis interval may be stored in a memory of the control unit 114. Alternatively, or in combination, data pertaining to the hysteresis interval may be stored in a memory accessible by the control unit 114, such as a memory arranged in the control valve 110 itself or in a database comprising data pertaining to an ID:s of control valves 110 and data pertaining to the hysteresis intervals for the control valves 110 linked to the ID:s of the control valves.

The control valve 110 may be a linear control valve or a non-linear control valve. Upon the control valve 110 is a linear control valve, the flow through the control valve 110 and the degree of opening have a linear relation.

Figure 2:
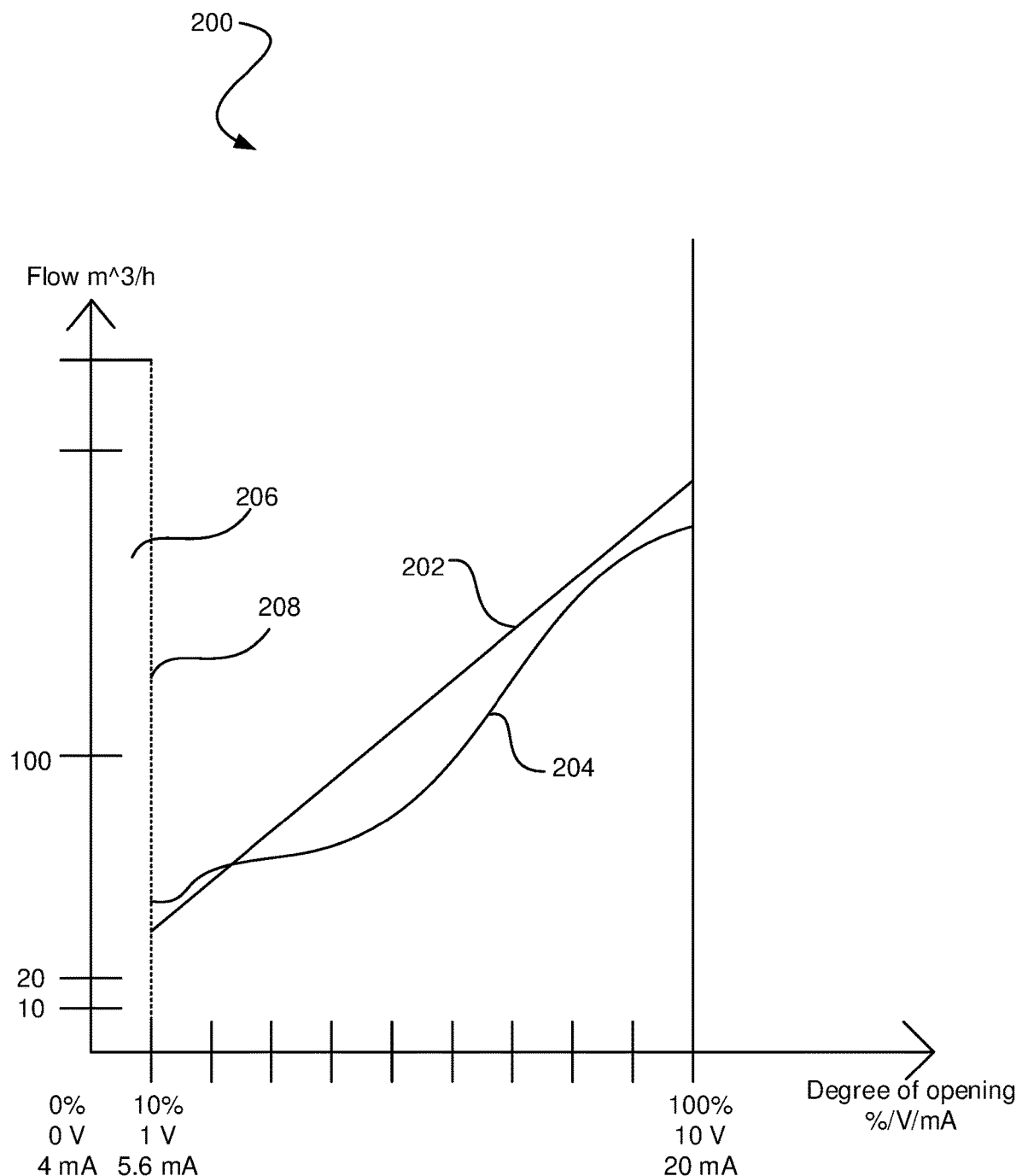
FIG. 2 is a line chart of the relation between the flow and the degree of opening.

In connection with FIG. 2, an example of a line chart 200 illustrating the flow through the control valve 110 in relation to the degree of opening of the control valve 110 is shown.

The x-axis of the line chart 200 is the degree of opening. The degree of opening may correspond to percentages, ranging from 0-100%. The degree of opening may correspond to an electric potential signal [V] controlling the control valve 110. Alternatively, or in combination, the degree of opening may correspond to an electric current signal [mA] controlling the control valve 110. The y-axis of the line chart 200 is the flow through the control valve $[m^3/h]$.

A first line 202 illustrates a linear relation between the flow and the degree of opening. The linear relation between the flow and the degree of opening indicates that the control valve 110 is a linear control valve. A second line 204 illustrates a non-linear relation between the flow and the degree of opening. The non-linear relation between the flow and the degree of opening indicates that the control valve 110 is a non-linear control valve.

As discussed above, the hysteresis interval 206 for the control valve 110 may e.g. be 0-10% of the degree of opening. A dotted vertical line 208 illustrates the hysteresis interval 206. Neither the first nor the second line 202, 204 is illustrated in the hysteresis interval 208. This is because the flow in the hysteresis interval 206 is unknown.

According to the example illustrated in FIG. 2, wherein the size of the hysteresis interval 206 and the size of the total stroke for the control valve 110 is known. The hysteresis interval 206 is set to be 0-4 mm of the total stroke, which is 40 mm, for the control valve 110. Thus, the minimum controllable degree of opening is 4 mm. The hysteresis interval 206 can be translated with the demand signal. Thus, the hysteresis interval is 0-10% of the total degree of opening. Alternatively, or in combination, the hysteresis interval 206 is 0-1 V. Alternatively, or in combination, the hysteresis interval 206 is 4-5.6 mA. Upon the control unit 114 calls for a desired value within the hysteresis interval 206, the disclosed method will change the desired value to 0 V or 4 mA and closing the control valve 110 until the desired value has reached a value excess 1 V or 5.6 mA. This example refers to the linear control valve 110 but is applicable to the non-linear control valve as well.

Figure 3:
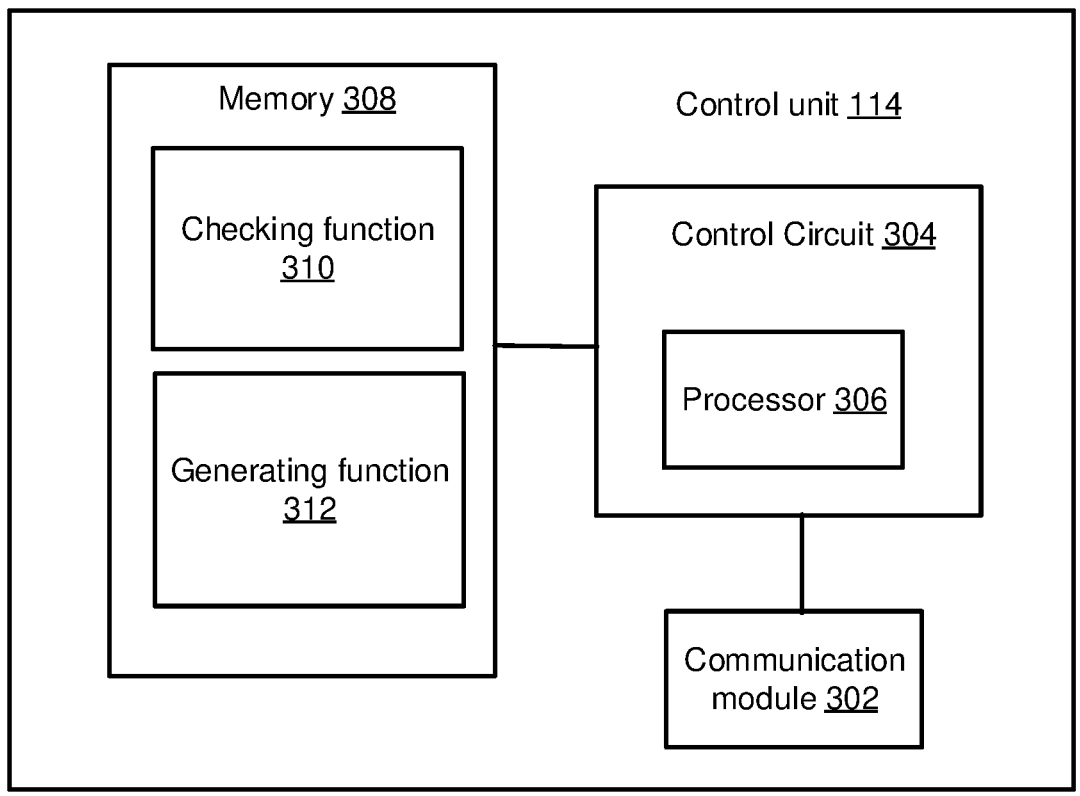
FIG. 3 is a schematic diagram of a control unit configured to control a control valve of the thermal energy system in FIG. 1.

In connection with FIG. 3 the control unit 114 configured to control the control valve 110 will be discussed in more detail. The control unit 114 comprises a communication module 302, a control circuit 304, and a memory 308.

The communication module 302 is configured to communicate with a local thermal energy circuit 112, especially with the demand sensor of the local thermal energy circuit 112. The communication path over which the communication is made may be wired or wireless. The communication may include data transfers, and the like. Data transfers may include, but are not limited to, downloading and/or uploading data and receiving or sending messages. The data may be processed by the control unit 114. The processing may include storing the data in a memory, e.g., the memory 308 of the control unit 114, executing operations or functions, and so forth.

The control circuit 304 is configured to carry out overall control of functions and operations of the control unit 114. The control circuit 304 may include a processor 306, such as a central processing unit (CPU), microcontroller, or microprocessor. The processor 306 is configured to execute program code stored in the memory 308, in order to carry out functions and operations of the control unit 114.

The memory 308 may be one or more of a buffer, a flash memory, a hard drive, a removable media, a volatile memory, a non-volatile memory, a random access memory (RAM), or other suitable devices. In a typical arrangement, the memory 308 may include a non-volatile memory for long term data storage and a volatile memory that functions as system memory for the control circuit 304. The memory 308 may exchange data with the control circuit 304 over a data bus. Accompanying control lines and an address bus between the memory 308 and the control circuit 304 also may be present.

Functions and operations of the control unit 114 may be embodied in the form of executable logic routines (e.g., lines of code, software programs, etc.) that are stored on a non-transitory computer readable medium (e.g., the memory 308) of the control unit 114 and are executed by the control circuit 304 (e.g., using the processor 306). Furthermore, the functions and operations of the control unit 114 may be a stand-alone software application or form a part of a software application that carries out additional tasks related to the control unit 114. The described functions and operations may be considering a method that the corresponding device is configured to carry out. Also, while the described functions and operations may be implemented in software, such functionality may as well be carried out via dedicated hardware or firmware, or some combination of hardware, firmware and/or software.

The control circuit 304 is configured to execute a checking function 310. The checking function 310 is configured to check if a demand signal received from the local thermal energy circuit 112 is indicative of setting the control valve 110 in a hysteresis interval for the control valve 110. The checking function 310 may access a look-up table 214 stored in the memory 308 of the control unit 114. The look-up table comprises information pertaining to if a demand signal for a specific control valve 110 is indicative of setting the control valve 110 in the hysteresis interval or not. The checking function 310 may further be configured to check if the demand signal is indicative of setting the control valve 110 in the hysteresis interval for the control valve 110 by accessing the look-up table. The checking function 310 may further be configured to translate the received demand signal to a degree of opening for the control valve 110. Thereafter, the checking function 310 may further be configured to check, in the look-up table, if the degree of opening is in the hysteresis interval for the control valve 110. According to non-limiting examples, the look-up table may comprise information, such as hysteresis interval for the control valve 110, the minimum and maximum degree of opening for the control valve 110, and the like, pertaining to the demand signal. As discussed above, the hysteresis interval for the control valve 110 may be provided by the producer of the control valve 110. Alternatively, or in combination. Alternatively, or in combination, the hysteresis interval for the control valve 110 may be set during a calibration of the control valve 110. Alternatively, or in combination, the hysteresis interval for the control valve 110 may be set during the second calibration of the control valve 110 by using flow sensors. The flow sensor may be arranged in the local thermal energy circuit 112. It is realized that the look-up table may be store elsewhere as long as it is accessible by the control unit 114.

The control circuit 304 is further configured to execute a control signal generating function 312. The control signal generating function 312 is configured to, upon demand signal is indicative of setting the control valve 110 in the hysteresis interval, generate a first and a second control signal for alternatingly setting the control valve 110 above the hysteresis interval or closing the control valve 110. The first control signal is configured to set the control valve 110 above the hysteresis interval. The second control signal is configured to set the control valve 110 in the closed position. Hence, for some period of time the control signal generating function 312 is configured to generate the first control signal configured to set the control valve 110 to be open above the hysteresis interval and for some other period of time the control signal generating function 312 is configured to generate the second control signal configured to set the control valve 110 to be closed. By alternatingly it is meant that upon the generating function 312 generates the first control signal, the control valve 110 is set above the hysteresis interval, preferably to the minimum degree of opening, until a first predetermined criterion is fulfilled. Thereafter, the generating function 312 generates the second control signal instructing the control valve 110 to be set in a closed state, until a second predetermined criterion is fulfilled. The alternatingly setting of the control valve 110 may be performed until the demand signal is indicative of setting the control valve 110 outside the hysteresis interval.

Thus, neither the first nor the second control signal is configured to set the control valve 110 in the hysteresis interval. Hence, the control valve 110 is not allowed to be set in the hysteresis interval. This may be beneficial since the control valve 110 lacks control capability when it is in the hysteresis interval. Therefore, upon the demand signal indicates that the control valve 110 should be set in the hysteresis interval, the generating function alternatively in time generates the first or the second control signal in order to make sure that the control valve 110 is set above the hysteresis interval or in the closed state: By doing so it is ensured that the control valve 110 has control capability.

The first predetermined criterion may be a first predetermined time period. The first predetermined time period may be in the order of minutes or hours. Alternatively, or in combination, the first predetermined criterion may be a first predetermined temperature of a temperature in the local thermal energy circuit 112. The first predetermined temperature may be higher than the flow line temperature.

The second predetermined criterion may be a second predetermined time period. The second predetermined time period may be in the order of minutes or hours. Alternatively, or in combination, the second predetermined criterion may be a second predetermined temperature of a temperature in the local thermal energy circuit 112. The second predetermined temperature may be lower than the flow line temperature.

Upon the first and second predetermined criterion is the first and second predetermined time periods, the generating function 312 may further be configured to generate the second control signal upon the first predetermined time period is fulfilled and the first control signal upon the second predetermined time period is fulfilled. Hence, upon the first predetermined time period is fulfilled, the control valve 110 may be set in its closed position and upon the second predetermined time period is fulfilled, the control valve 110 may be set to its minimum degree of opening. In order to be able to determine the first and/or second predetermined time period, the control unit 114, especially the control circuit 304 of the control unit 114 may comprise a clock.

Upon the first and second predetermined criterion is the first and second predetermined temperature, the generating function 312 may further be configured to generate the second control signal upon a temperature signal is above the first predetermined temperature and the first demand signal upon the temperature signal is below the second predetermined temperature. The temperature signal may be received by the communication module 304 from a temperature sensor arranged in the local thermal energy circuit 112. The temperature signal is indicative of a temperature of the heat transfer fluid in the local thermal energy circuit 112.

The first and second predetermined criterions are not limited to the first and second predetermined time period and the first and second predetermined temperature, these should only be seen as non-limiting examples.

Further, upon the demand signal is indicative of setting the control valve 110 above the hysteresis interval, the generating function 312 is configured to generate the control signal to correspond to a degree of opening corresponding to the demand signal.

The communication module 302 is further configured to send the respective control signal to the control valve 110.

By way of example, upon the demand signal is indicative of setting the control valve 110 in the hysteresis interval, which is not allowed due to the lack of control capability in the hysteresis interval for the control valve 110, the generating function alternately generates the first and second control signals. The first control signal may be indicative of setting the control valve 110 to the minimum controllable degree of opening, which is larger than the degree of opening for the demand signal. Upon the degree of opening for the control valve 110 is larger than the degree of opening for the demand signal, the temperature of the fluid of the local thermal energy circuit 112 may increase due to that there is a higher flow through the control valve 110 than needed. Upon the generating function 312 generates the second control signal, indicative of closing the control valve 110, the degree of opening for the control valve 110 is smaller than the degree of opening for the demand signal. Upon the degree of opening for the control valve 110 is smaller than the degree of opening for the demand signal, the temperature of the fluid of the local thermal energy circuit 112 may decrease due to that there is a smaller flow through the control valve 110 than needed.

Hence, by analyzing the demand signal for the control valve 110, the control unit 114 may be configured to set the control valve 110 outside the hysteresis interval. Upon the demand signal is indicative of setting the control valve 110 in the hysteresis interval, the control unit 114 is configured to alternately generate the first and second control signals indicative of setting the control valve 110 outside the hysteresis interval. Upon the control unit 114 sets the control valve 110 outside the hysteresis interval, the control valve 110 is able to control the flow through the control valve 110.

Thus, upon there is information pertaining to the range of the hysteresis interval, the control unit 114 may be configured to set the control valve 110 outside the hysteresis interval. Hence, upon there is information pertaining to the range of the hysteresis interval, the control unit 114 may be configured to "know" within which interval the control valve 110 should not be set. Hence, by this arrangement it is possible to control the degree of opening for the control valve 110 in order to make sure that the control valve 110 always is set outside the hysteresis interval. By doing this, the control valve 110 may all the time have the control capability to control the degree of opening for the control valve 110.

Figure 4:
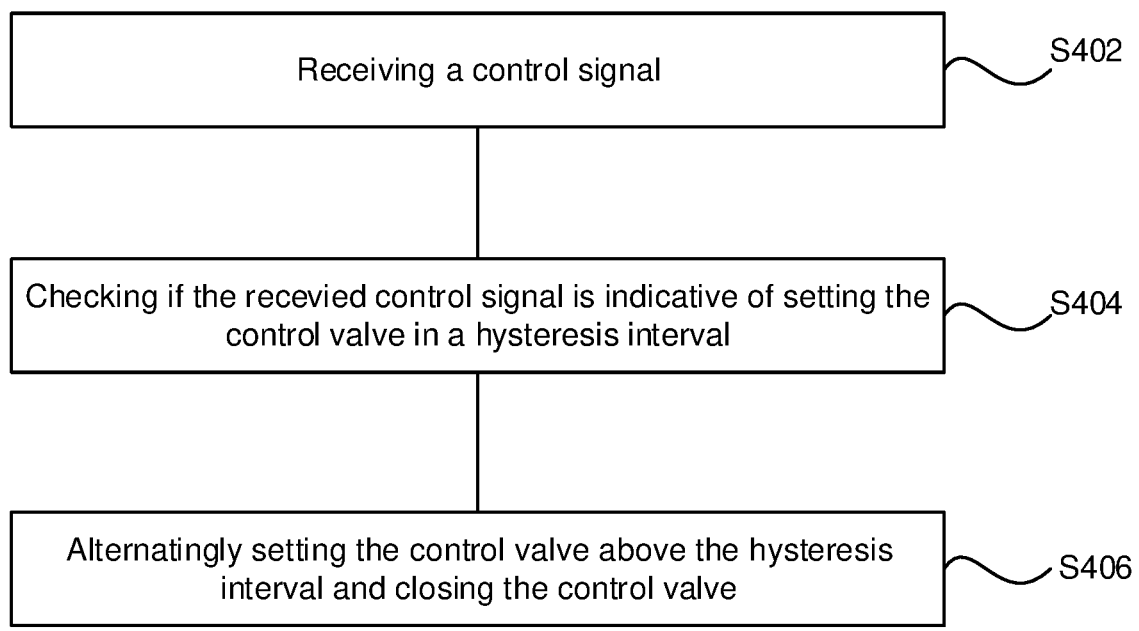
FIG. 4 is a flow chart illustrating a method for controlling the control valve.

In connection with FIG. 4 a flow chart illustrating a method for controlling the control valve 110 will be discussed. The control valve 110 is configured to control a flow of heat transfer fluid into the thermal energy extraction unit 108. The method comprises the flowing steps.

Reviewing S402 a demand signal for the control valve 110. The demand signal may be received from the local thermal energy circuit 112, especially from a demand sensor of the local thermal energy circuit 112.

Checking S404 if the demand signal is indicative of setting the control valve 110 in a hysteresis interval for the control valve 110. The step of checking S404 may further comprise checking, in a look-up table, if the demand signal pertains to if the control valve 110 is to be set in the hysteresis interval or not upon controlling the control valve 110 using the demand signal. Alternatively, or in combination, the step of checking S404 may further comprise translating the demand signal to a degree of opening for the control valve 110 and checking, in the look-up table, if the degree of opening is within the hysteresis interval for the control valve 110.

Upon the demand signal is indicative of setting the control valve 110 in the hysteresis interval, the method further comprises alternatingly S406 setting the control valve 110 above the hysteresis interval or closing the control valve 110. The step of alternatingly S406 setting the control valve 110 above the hysteresis interval or closing the control valve 110 may be performed by alternatingly setting the control valve 110 above the hysteresis interval until a first predetermined criterion is fulfilled and thereafter closing the control valve 110 until the second predetermined criterion is fulfilled. The first predetermined criterion may be a first predetermined time period. The second predetermined criterion may be a second predetermined time period. Alternatively, or in combination, the first predetermined criterion may be a first predetermined temperature of the temperature in the local thermal energy circuit 112. Alternatively, or in combination, the second predetermined criterion may be a second predetermined temperature of the temperature in the local thermal energy circuit 112.

The steps of the method may be performed in any order suitable.

Additionally, variations to the disclosed embodiments can be understood and effected by the skilled person in practicing the claimed invention, from a study of the drawings, the disclosure, and the appended claims.

The invention claimed is:

1. A method for controlling a control valve, wherein the control valve is configured to control a flow of heat transfer fluid to a thermal energy extraction unit, wherein the control valve has a predetermined lower flow limit below which the control valve is experiencing hysteresis, the method comprising:

receiving and reviewing a demand signal for the control valve;

checking if the demand signal for the control valve is indicative of setting the control valve in a hysteresis interval for the control valve; and upon the demand signal is indicative of setting the control valve in the hysteresis interval, alternatingly setting the control valve in an open state above the hysteresis interval or setting the control valve in a closed state.

2. The method according to claim 1, wherein the step of alternatingly setting the control valve in an open state above the hysteresis interval or setting the control valve in the closed state is performed by alternatingly setting the control valve in an open state above the hysteresis interval until a first predetermined criterion is fulfilled and setting the control valve in the closed state until a second predetermined criterion is fulfilled.

3. The method according to claim 2, wherein the first predetermined criterion is a first predetermined time period and wherein the second predetermined criterion is a second predetermined time period.

4. The method according to claim 2, wherein the first predetermined criterion is a first temperature in a local thermal energy circuit configured to extract thermal energy from the thermal energy extraction unit, and wherein the second predetermined criterion is a second temperature in the local thermal energy circuit configured to extract thermal energy from the thermal energy extraction unit.

5. The method according to claim 1, wherein the step of checking if the demand signal is indicative of setting the control valve in the hysteresis interval for the control valve comprises:
   checking in a look-up table if the demand signal pertains to if the control valve is set in the hysteresis interval or not upon controlling the control valve using the demand signal.

6. The method according to claim 5, wherein the step of checking if the demand signal is indicative of setting the control valve in the hysteresis interval for the control valve comprises:
   translating the demand signal to a degree of opening for the control valve; and
   checking in the look-up table if the degree of opening is within the hysteresis interval for the control valve.

7. The method according to claim 4, wherein the demand signal for the control valve is received from the local thermal energy circuit configured to extract heat or cold from the thermal energy extraction unit.

8. A control unit configured to control a control valve, wherein the control valve has a predetermined lower flow limit below which the control valve is experiencing hysteresis, the control unit comprising:
   a communication module configured to receive a demand signal indicative of setting the control valve in a specific degree of opening;
   a control circuit configured to execute:
   a checking function configured to check if the demand signal, received by the communication module, is indicative of setting the control valve in a hysteresis interval for the control valve, and
   a generating function configured to, upon the received demand signal is indicative of setting the control valve in the hysteresis interval for the control valve, generate a first or a second control signal for alternatingly setting the control valve in an open state above the hysteresis interval or setting the control valve in a closed state;
   wherein the communication module is further configured to send the first and second control signal to the control valve.

9. The control unit according to claim 8, wherein the first control signal is configured to set the control valve in an open state above the hysteresis interval until a first predetermined criterion is fulfilled and wherein the second control signal is configured to set the control valve in the closed state until a second predetermined criterion is fulfilled.

10. The control unit according to claim 9, wherein the first predetermined criterion is a first predetermined time period and wherein the second predetermined criterion is a second predetermined time period,
    wherein the control unit further comprises a clock configured to determine the first predetermined time period and the second predetermined time period; and
    wherein the generating function is further configured to generate the second control signal upon the first predetermined time period is fulfilled and to generate the first control signal upon the second predetermined time period is fulfilled.

11. The control unit according to claim 9, wherein the first predetermined criterion is a first predetermined temperature and the second predetermined criterion is a second predetermined temperature,
    wherein the communication module is further configured to receive a temperature signal indicative of a temperature of a heat transfer fluid in a local thermal energy circuit;
    wherein the generating function is further configured to generate the second output signal upon the temperature signal is above the first predetermined temperature and the first output signal upon the temperature signal is below the second predetermined temperature.

12. The control unit according to claim 8, further comprising memory having recorded thereon a look-up table comprising information pertaining to if a specific demand signal is indicative of if the control valve is to be set in the hysteresis interval for the control valve or not,
    wherein the checking function is configured to check if the demand signal is indicative of setting the control valve in the hysteresis interval for the control valve by accessing the look-up table.

13. The control unit according to claim 12, wherein the checking function is further configured to:
    translate the received demand signal to a degree of opening for the control valve; and
    check in the look-up table if the degree of opening is within the hysteresis interval for the control valve.

14. A thermal energy system comprising:
    a thermal energy extraction unit connected to a district grid;
    a local thermal energy circuit connected to the thermal energy extraction unit for extracting heat or cold from the same;
    a control valve configured to control a flow of heat transfer fluid from a first conduit of the district grid, via the thermal energy extraction unit, to a second conduit of the district grid, wherein the control valve has a predetermined lower flow limit below which the control valve is experiencing hysteresis; and
    a control unit according to claim 8.

* * * * *